United States Patent
Hon et al.

(10) Patent No.: US 6,629,073 B1
(45) Date of Patent: Sep. 30, 2003

(54) SPEECH RECOGNITION METHOD AND APPARATUS UTILIZING MULTI-UNIT MODELS

(75) Inventors: Hsiao-Wuen Hon, Woodinville, WA (US); Kuansan Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/559,505

(22) Filed: Apr. 27, 2000

(51) Int. Cl.$^7$ .............................................. G01L 15/06
(52) U.S. Cl. ........................ 704/256; 704/253
(58) Field of Search .............................. 704/231, 240, 704/245, 249, 256, 243, 251

(56) References Cited

U.S. PATENT DOCUMENTS

| | | | | |
|---|---|---|---|---|
| 4,914,703 A | * | 4/1990 | Gillick ........................ | 381/43 |
| 5,133,012 A | | 7/1992 | Nitta ............................ | 381/43 |
| 5,369,726 A | * | 11/1994 | Kroeker et al. ............. | 704/236 |
| 5,572,624 A | * | 11/1996 | Sejnoha ...................... | 704/256 |
| 5,617,509 A | | 4/1997 | Kushner et al. ........... | 395/2.65 |
| 5,625,749 A | | 4/1997 | Goldenthal et al. ........ | 395/2.63 |
| 5,787,396 A | * | 7/1998 | Komori et al. ............. | 704/256 |
| 5,937,384 A | * | 8/1999 | Huang et al. ............... | 704/256 |
| 6,055,498 A | | 4/2000 | Neumeyer et al. .......... | 704/246 |
| 6,092,045 A | | 7/2000 | Stubley et al. .............. | 704/254 |
| 6,185,528 B1 | | 2/2001 | Fissore et al. .............. | 704/232 |

OTHER PUBLICATIONS

"Probabilistic–trajectory segmental HMMs", *Computer Speech and Language*, by Wendy J. Holmes et al., Article No. csla. 1998.0048, pp. 3–37 (1999).

"Parametric Trajectory Mixtures for LVCSR", by Man–hung Siu et al., ICSLP–1998, 4 pages.

"Speech Recognition Using Hidden Markov Models with Polynomial Regression Functions as Nonstationary States", by Li Deng et al., IEEE Transactions on Speech and Audio Processing, vol. 2, No. 4, pp. 507–520 (Oct. 1994).

"From HMM's to Segment Models: A Unified View of Stochastic Modeling for Speech Recognition", by Mari Ostendorf et al., IEEE Transactions on Speech and Audio Processing, vol. 4, No. 5, pp. 360–379 (Sep. 1996).

U.S. patent application Ser. No. 09/560,506, Ho et al., filed Apr. 27, 2000.

* cited by examiner

*Primary Examiner*—Daniel Abebe
(74) *Attorney, Agent, or Firm*—Theodore M. Magee; Westman, Champlin & Kelly, P.A.

(57) ABSTRACT

A speech recognition method and system utilize an acoustic model that is capable of providing probabilities for both a large acoustic unit and an acoustic sub-unit. Each of these probabilities describes the likelihood of a set of feature vectors from a series of feature vectors representing a speech signal. The large acoustic unit is formed from a plurality of acoustic sub-units. At least one sub-unit probability and at least on large unit probability from the acoustic model are used by a decoder to generate a score for a sequence of hypothesized words. When combined, the acoustic sub-units associated with all of the sub-unit probabilities used to determine the score span fewer than all of the feature vectors in the series of feature vectors. An overlapping decoding technique is also provided.

36 Claims, 6 Drawing Sheets

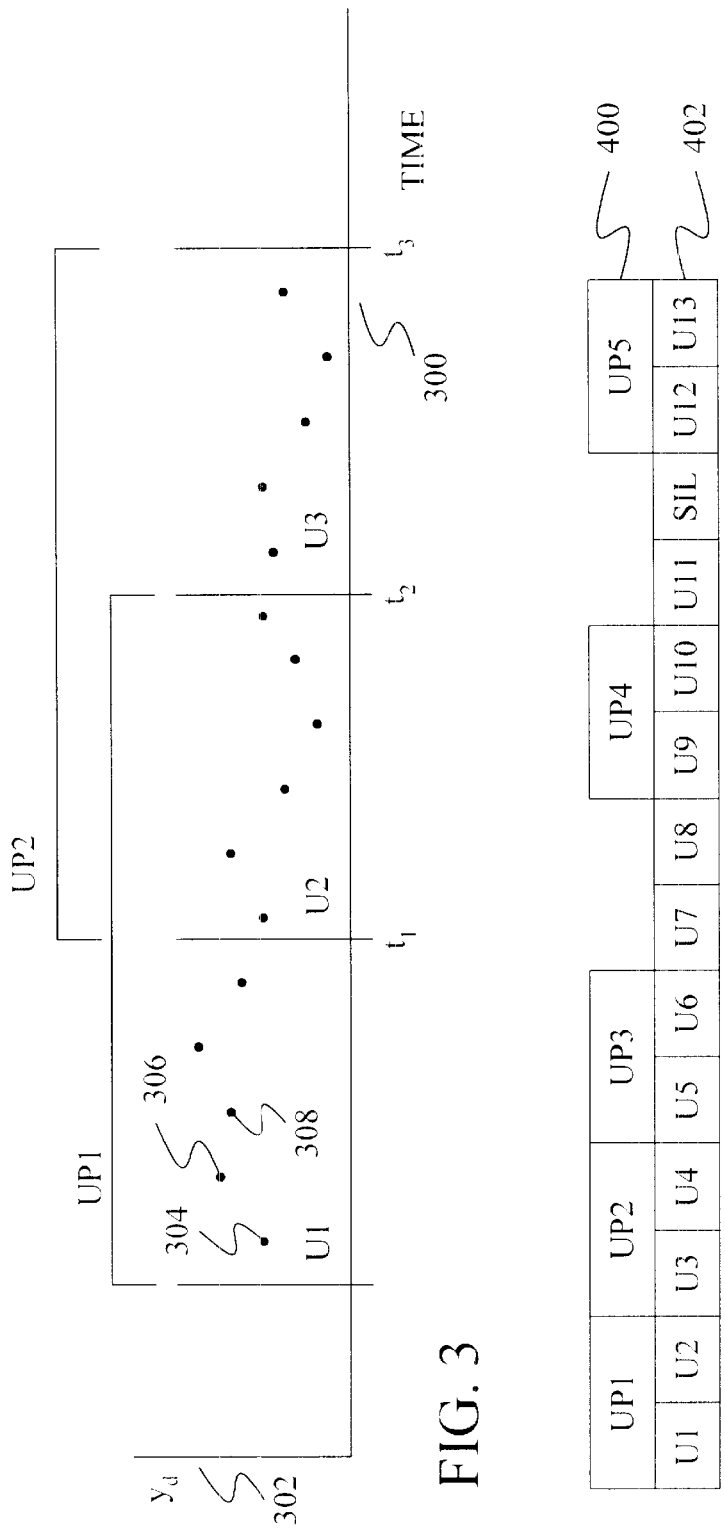
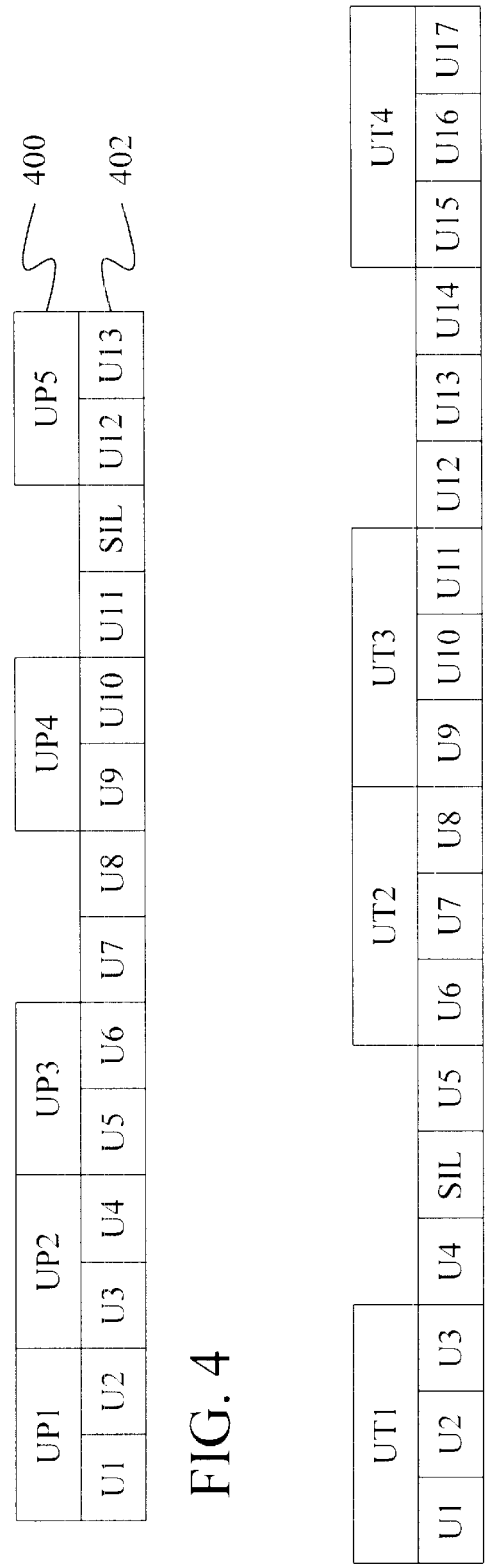
FIG. 3
FIG. 4
FIG. 5

SPEECH RECOGNITION METHOD AND APPARATUS UTILIZING MULTI-UNIT MODELS

REFERENCE TO RELATED APPLICATIONS

The present application is related to U.S. patent application Ser. No. 09/560,506, entitled TEMPORAL PATTERN RECOGNITION METHOD AND APPARATUS UTILIZING SEGMENT AND FRAME-BASED MODELS, and filed on Apr. 27, 2002.

BACKGROUND OF THE INVENTION

The present invention relates to speech recognition. In particular, the present invention relates to the use of models to perform speech recognition.

In speech recognition systems, an input speech signal is converted into words that represent the verbal content of the speech signal. This conversion begins by converting the analog speech signal into a series of digital values. The digital values are then passed through a feature extraction unit, which computes a sequence of feature vectors based on the digital values. Each feature vector is typically multi-dimensional and represents a single frame of the speech signal.

To identify a most likely sequence of words, the feature vectors are applied to one or more models that have been trained using a training text. Typically, this involves applying the feature vectors to a frame-based acoustic model in which a single frame state is associated with a single feature vector. Recently, however, segment models have been introduced that associate multiple feature vectors with a single segment state. The segment models are thought to provide a more accurate model of large-scale transitions in human speech.

All models, both frame based and segment based, determine a probability for an acoustic unit. In initial speech recognition systems, the acoustic unit was an entire word. However, such systems required a large amount of modeling data since each word in the language had to be modeled separately. For example, if a language contains 10,000 words, the recognition system needed to 10,000 models.

To reduce the number of models needed, the art began using smaller acoustic units. Examples of such smaller units include phonemes, which represent individual sounds in words, and senones, which represent individual states within phonemes. Other recognition systems used diphones, which represent an acoustic unit spanning from the center of one phoneme to the center of a neighboring phoneme.

When determining the probability of a sequence of feature vectors, speech recognition systems of the prior art did not mix different types of acoustic units. Thus, when determining a probability using a phoneme acoustic model, all of the acoustic units under consideration would be phonemes. The prior art did not use phonemes for some segments of the speech signal and senones for other parts of the speech signal. Because of this, developers had to decide between using larger units that worked well with segment models or using smaller units that were easier to train and required less data.

During speech recognition, the probability of an individual acoustic unit is often determined using asset of Gaussian distributions. At a minimum, a single Gaussian distribution is provided for each feature vector spanned by the acoustic units.

The Gaussian distributions are formed from training data and indicate the probability of a feature vector having a specific value for a specific acoustic unit. The distributions are formed by measuring the values of the feature vectors that are generated by a trainer reciting from a training text. For example, for every occurrence of the phoneme "th" in the training text, the resulting values of the feature vectors are measured and used to generate the Gaussian distribution.

Because different speakers produce different speech signals, a single Gaussian distribution for an acoustic unit can sometimes produce a high error rate in speech recognition simply because the observed feature vectors were produced by a different speaker than the speaker used to train the system. To overcome this, the prior art introduced a mixture of Gaussian distributions for each acoustic unit. Within each mixture, a separate Gaussian is generated for one group of speakers. For example, there could be one Gaussian for the male speakers and one Gaussian for the female speakers.

Using a mixture of Guassians, each acoustic unit has multiple targets located at the mean of each Guassian. Thus, for a particular acoustic unit, one target may be from a male training voice and another target may be from a female training voice.

Since the probability associated with each acoustic unit is determined serially under the prior art, it is possible to use targets associated with two different groups of speakers when determining the probabilities of feature vectors for two neighboring acoustic units. Thus, in one acoustic unit, a target associated with a male trainer may be used to determine the probability of a set of feature vectors and in the next acoustic unit a target associated with a female speaker may be used to determine the probability of a set of feature vectors. Such a discontinuity in the targets between neighboring acoustic units is undesirable because it represents a trajectory in the speech signal that never occurs in the training data. Such a trajectory is known as a phantom trajectory in the art.

SUMMARY OF THE INVENTION

A speech recognition method and system utilize an acoustic model that is capable of providing probabilities for both a large acoustic unit and an acoustic sub-unit. Each of these probabilities describes the likelihood of a set of feature vectors from a series of feature vectors representing a speech signal. The large acoustic unit is formed from a plurality of acoustic sub-units. At least one sub-unit probability and at least one large unit probability from the acoustic model are used by a decoder to generate a score for a sequence of hypothesized words. When combined, the acoustic sub-units associated with all of the sub-unit probabilities used to determine the score span fewer than all of the feature vectors in the series of feature vectors.

In some embodiments of the invention, an overlapping decoding technique is used. In this decoding system, two acoustic probabilities are determined for two sets of feature vectors wherein the two sets of feature vectors are different from each other but include at least one common feature vector. A most likely sequence of hypothesized words is then identified using the two acoustic probabilities.

BRIEF DESCRIPTION OF THE DRAWINGS

FIG. 3 is a graph showing the segmentation of one dimension of a feature vector under the present invention.

FIG. 4 is a graph showing the relationship between unit pairs and individual units under the present invention.

FIG. 5 is a graph showing the relationship between unit triples and individual units under the present invention.

DETAILED DESCRIPTION OF ILLUSTRATIVE EMBODIMENTS

Figure 1:
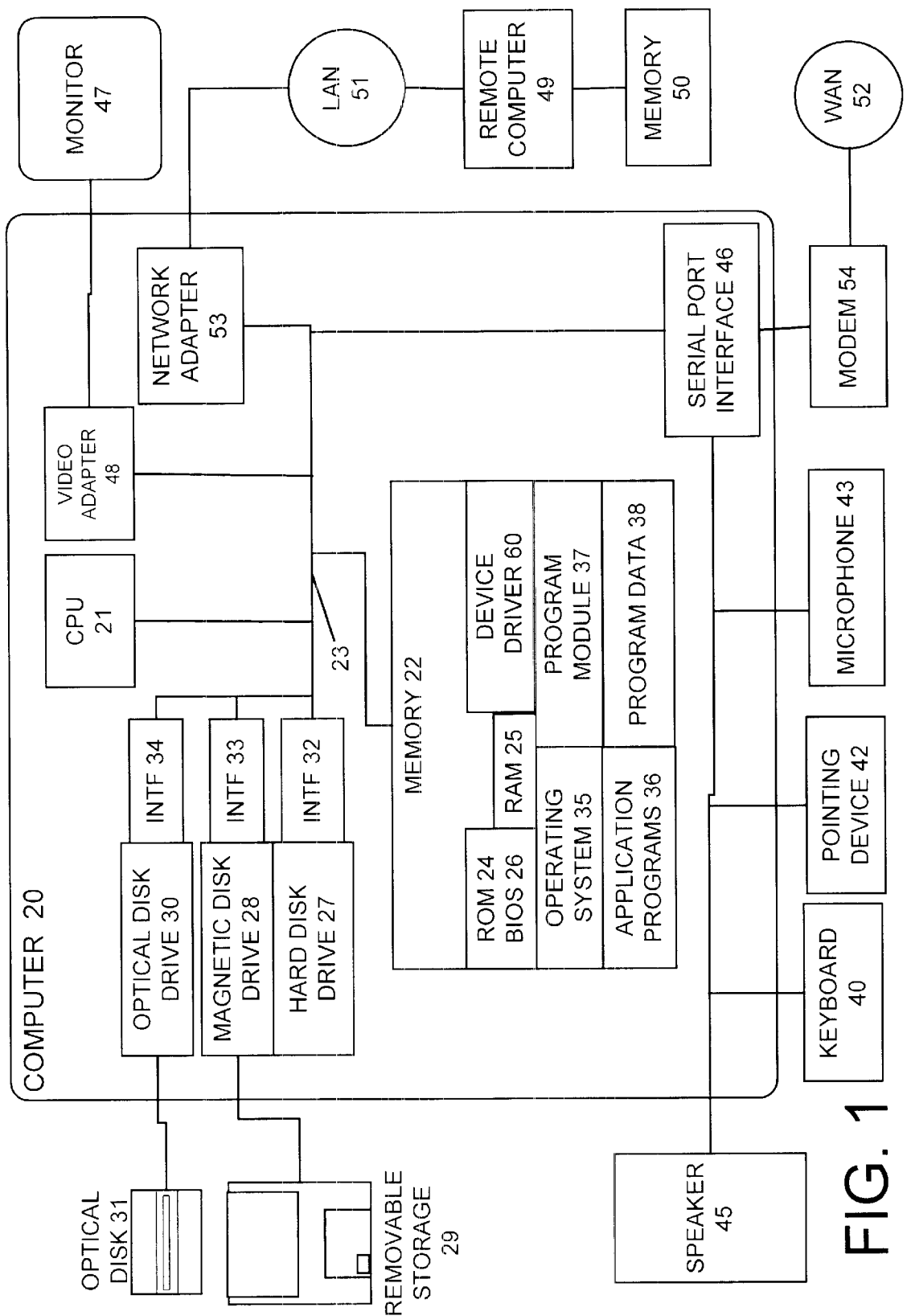
FIG. 1 is a plan view of a general computing environment in which one embodiment of the present invention is used.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through local input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interfaces 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Although FIG. 1 shows an exemplary environment, the present invention is not limited to a digital-computing environment. In particular, the present invention can be operated on analog devices or mixed signal (analog and digital) devices. Furthermore, the present invention can be implemented on a single integrated circuit, for example, in small vocabulary implementations.

Figure 2:
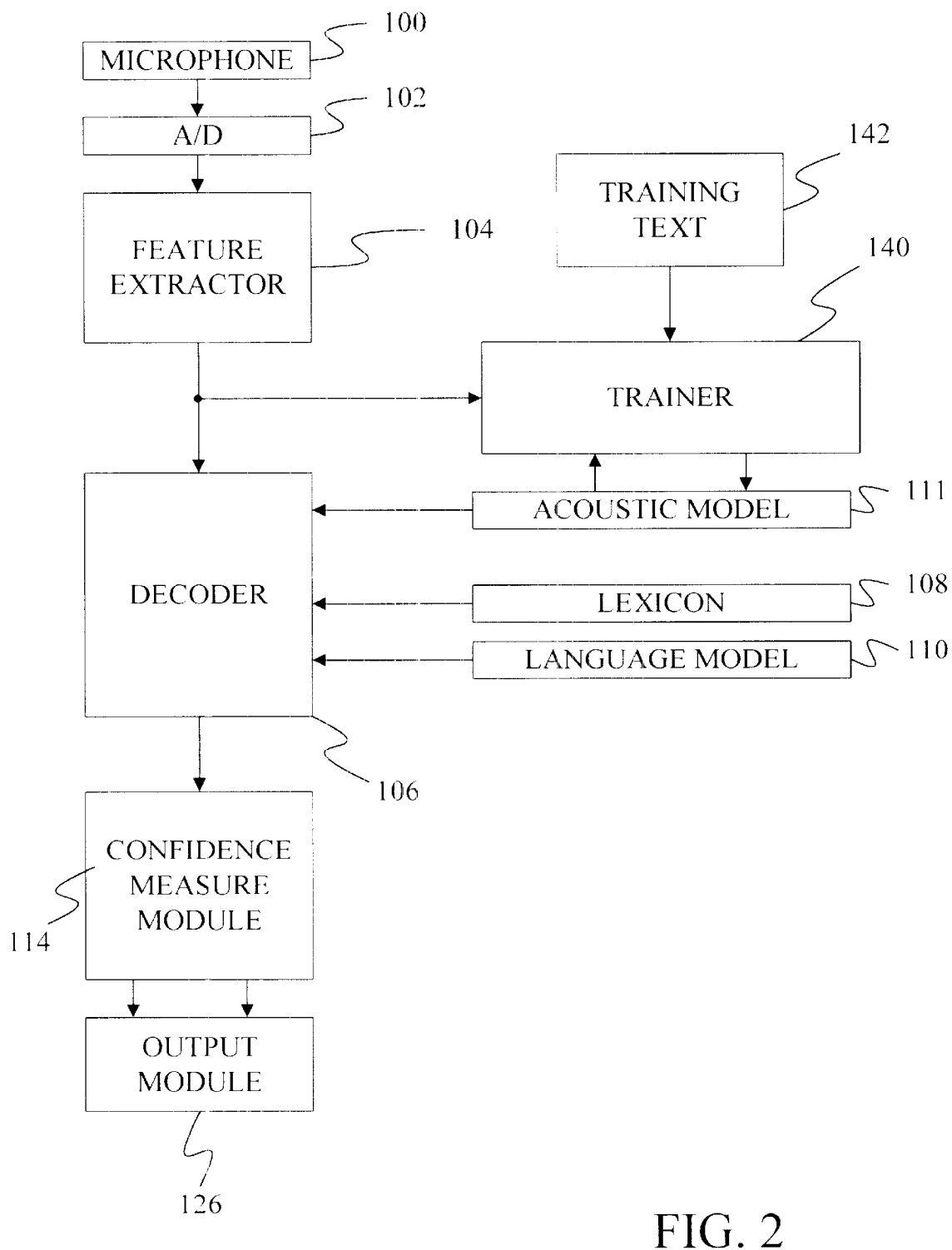
FIG. 2 is a block diagram of a speech recognition system of an embodiment of the present invention.

FIG. 2 provides a more detailed block diagram of modules of the general environment of FIG. 1 that are particularly relevant to the present invention. In FIG. 2, an input speech signal is converted into an electrical signal by a microphone 100, which is connected to an analog-to-digital (A-to-D) converter 102. A-to-D converter 102 converts the analog signal into a series of digital values. In several embodiments, A-to-D converter 102 samples the analog signal at 16 kHz thereby creating 16 kilobytes of speech data per second.

The digital data created by A-to-D converter 102 is provided to a feature extractor 104 that extracts a feature from the digital speech signal. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The feature extraction module receives the stream of digital values from A-to-D converter 102, and produces a stream of feature vectors that are each associated with a frame of the speech signal. In many embodiments, the centers of the frames are separated by 10 milliseconds.

The stream of feature vectors produced by the extraction module is provided to a decoder 106, which identifies a most likely sequence of words based on the stream of feature vectors, an acoustic model 111, a language model 110, and a lexicon 112.

Acoustic model 111 indicates how likely it is that a sequence of feature vectors would be produced by a particular sequence of acoustic units found in a sequence of hypothesized words. Under some embodiments of the invention, the acoustic units can be any commonly used acoustic unit such as a senone, phoneme, diphone, syllable, or word. Under many embodiments, the acoustic unit is the combination of a set of sub-units. Such acoustic units are described in more detail below.

Language model 110 provides a set of likelihoods that a particular sequence of words will appear in the language of interest. In many embodiments, the language model is based on a text database such as the North American Business News (NAB), which is described in greater detail in a publication entitled CSR-III Text Language Model, University of Pennsylvania, 1994. The language model may be a context-free grammar or a statistical N-gram model such as a trigram. In one embodiment, the language model is a compact trigram model that determines the probability of a sequence of words based on the combined probabilities of three-word segments of the sequence.

Based on the acoustic model, the language model, and a lexicon 108, decoder 106 identifies a most likely sequence of words from all possible word sequences. The particular method used to select the most probable sequence of words is discussed further below.

The most probable sequence of hypothesis words is provided to confidence measure module 114. Confidence measure module 114 identifies which words are most likely to have been improperly identified by the speech recognizer, based in part on a frame-based acoustic model. Confidence measure module 114 then provides the sequence of hypothesis words to an output module 126 along with identifiers indicating which words may have been improperly identified. Those skilled in the art will recognize that confidence measure module 114 is not necessary for the practice of the present invention.

Before acoustic model 111 may be used to decode a sequence of input feature vectors, it must be trained. In FIG. 2, such training is performed by trainer 140 based on training text 142, past model parameters from acoustic model 111 and training feature vectors from feature extractor 104. In most embodiments, such training involves developing a mixture of Gaussian models for each acoustic unit modeled by acoustic model 111. Those skilled in the art will recognize that a speech recognition system does not need trainer 140 if its models have been previously trained.

Under one embodiment of the present invention, the acoustic model utilizes acoustic units that are constructed from acoustic sub-units. Under the present invention, the large acoustic units and the acoustic sub-units can be used together to determine the probability of a sequence of hypothesized words. Specifically, the large acoustic units are used wherever possible, but are replaced with the individual acoustic sub-units when the large acoustic units do not provide a desirable probability distribution. For example, the large acoustic unit is replaced with its acoustic sub-units when the large acoustic unit appears infrequently in the training data and thus does not have a meaningful Gaussian distribution in the acoustic model. Similarly, when trajectory segment models are used and the large acoustic unit would otherwise include silence as an acoustic sub-unit, the silence sub-unit and the other acoustic sub-units that would otherwise form the larger acoustic unit are used in place of the larger acoustic unit. This replacement is performed because the arbitrary length of silence prevents the acoustic trajectory segment model for the larger acoustic unit from having a meaningful probability distribution.

Under the present invention, the acoustic sub-unit can be a senone or phoneme. The acoustic models can be frame-based acoustic models such as Hidden Markov Models, or can be segment models. The large acoustic unit can be constructed from any number of acoustic sub-units. For example, the large acoustic unit can be a unit pair constructed from two acoustic sub-units or can be a unit triple constructed from three acoustic sub-units. The present invention is not limited by the number of acoustic sub-units in a large acoustic unit.

FIG. 3 is a graph showing the values of one dimension of a sequence of feature vectors from an input speech signal. In FIG. 3, time is shown along horizontal axis 300 and the magnitude of the values is shown along vertical axis 302. In FIG. 3, the individual values of the feature vectors are shown as dots such as dots 304, 306 and 308. At the beginning of decoding, the feature vectors are assigned to segments of speech. Each segment represents an acoustic sub-unit under the present invention. For example, in a frame based acoustic model, a single feature will be assigned to a single senone. In a segment-based model, a sequence of feature vectors will be assigned to a single segment unit. In FIG. 3, this assignment is shown by large vertical bars at times $t_1$, $t_2$, and $t_3$ denoting the boundary between neighboring acoustic sub-units U1, U2 and U3.

Under the present invention, the feature vectors are also assigned to larger acoustic units. In FIG. 3, this larger acoustic unit is a unit pair. Thus, the feature vectors of acoustic sub-units U1 and U2 are assigned to unit pair UP1. Similarly, the feature vectors assigned to acoustic sub-units U2 and U3 are also assigned to acoustic unit pair UP2.

The acoustic model associated with a unit pair of FIG. 3 provides a probability that describes the likelihood of the entire sequence of feature vectors assigned to the unit pair. For example, the model for unit pair UP1 provides a probability for the sequence of eleven feature vectors that unit pair UP1 spans. This probability is independent of the individual models, if any, provided for the acoustic sub-units are combined to form the unit pair. Thus, the unit pair probability for UP1 is independent of the individual probabilities for acoustic sub-units U1 and U2 that are combined to form unit pair UP1.

FIG. 4 provides a block diagram showing the relationship between unit pairs and acoustic sub-units under one embodiment of the present invention. In FIG. 4, lower row 402 shows a sequence of acoustic sub-units that are found in a hypothesized sequence of words. Upper row 400 of FIG. 4 shows unit pairs that are used in place of acoustic sub-units during decoding. The vertical alignment between the unit pairs and the acoustic sub-units indicates that the unit pair is formed from the combination of the acoustic sub-units. For example, if acoustic sub-units U1 and U2 were the phonemes "th" and "e", acoustic unit pair UP1 would represent the phone-pair "the".

In FIG. 4, the decoder decodes the feature vectors by progressing from left to right. In most embodiments, the decoder attempts to use a unit pair model at every segment boundary unless the unit pair model is insufficient. When the unit pair model is insufficient, the decoder uses individual acoustic sub-unit models instead. In FIG. 4, unit pairs that have sufficiently well trained models are shown in row 400. A blank in row 400 indicates that the unit pair model is insufficient for the two acoustic sub-units below the blank. For example, the decoder would use unit pair UP1 to determine the likelihood of the feature vectors spanned by unit pair UP1. However, the decoder would use individual sub-unit models to determine the probability of feature vectors spanned by acoustic sub-units U7 and U8.

Acoustic unit pairs UP2, UP3, UP4 and UP5, similarly act as single acoustic units that span pairs of acoustic sub-units. In particular, unit pair UP2 spans sub-units U3 and U4, unit pair UP3 spans sub-units U5 and U6, unit pair UP4 spans sub-units U9 and U10, and unit pair UP5 spans sub-units U12 and U13. Thus, during decoding the acoustic models for unit pairs UP1, UP2, UP3, UP4 and UP5 are used to determine the probability of the feature vectors occurring during those unit pairs. Note that the models associated with the individual sub-units U1, U2, U3, U4, U5, U6, U9, U10, U12, and U13 are not used to determine the probability of the feature vectors. Thus, where a unit pair model is sufficient, it is used in place of the individual models for the sub-units of the unit pair.

Under some embodiments of the present invention, a unit pair model is insufficient if the unit pair appears infrequently in the training data. Such rare unit pairs do not have enough data associated with them to form well-defined probability distributions. Acoustic sub-units U7 and U8 provide an example of two sub-units that form a rare unit pair and are therefore modeled individually instead of having a unit pair model.

Under other embodiments of the present invention, a unit pair model is also insufficient if the unit pair includes an acoustic sub-unit representing silence. The reason for this is that the duration of silence can be arbitrarily long. This means that during training, a different length silence unit may be combined with the same acoustic sub-unit at different places in the training speech. When trajectory segment models are used as the acoustic models, the duration of the unit pairs is normalized during modeling, so differences in the duration of the silence sub-unit results in changes in the values of the feature vectors for the unit pair. This makes it difficult to produce a consistent set of feature vectors for modeling purposes resulting in an unstable distribution for the unit pair.

FIG. 4 shows an example of a silence acoustic sub-unit, SIL, that follows an acoustic sub-unit U11. As with acoustic sub-units U7 and U8, acoustic sub-unit U11 and the silence acoustic sub-unit are modeled individually.

The probability provided by the individual acoustic sub-unit models can either be context independent or context dependent under the present invention. For context independent models, the acoustic sub-unit probability is only dependent upon the acoustic sub-unit and the feature vectors that the acoustic sub-unit spans. For context dependent models, the probability for the acoustic sub-unit is also dependent on the identity of neighboring acoustic sub-units in the hypothesized sequence of words. For example, a triphone embodiment would determine the probability of the acoustic sub-unit based in part on the identity of the immediate previous and following phonemes in the sequence of hypothesized words. Note that even in a triphone model, the probability associated with the acoustic sub-unit only provides a probability of the feature vectors that the single acoustic sub-unit spans and does not include the feature vectors of the previous and following acoustic sub-units.

Thus, in FIG. 4, the probability of a sequence of hypothesized words is determined in part based on the probability of the observed feature vectors provided by the models for unit pairs UP1, UP2, UP3, UP4 and UP5 and the models provided for individual acoustic sub-units U7, U8, U11 and the silence acoustic sub-unit.

The present invention is not limited to having only two acoustic sub-units per larger acoustic unit. For example, in FIG. 5, unit triples are shown as the larger acoustic units, where each unit triple represents a combined model for three acoustic sub-units. Thus, unit triple UT1 represents a combined model for acoustic sub-units U1, U2 and U3 in FIG. 5. Similarly, unit triple UT2 represents acoustic sub-units U6, U7 and U8, unit triple UT3 represents acoustic sub-units U9, U10 and U11, and unit triple UT4 represent acoustic sub-units U15, U16 and U17.

The present invention is also not limited to having all the larger acoustic units comprise the same number of sub-units. For example, triplets and pair units can be mixed together in the acoustic model as long as there are sufficient training instances to yield meaningful probabilistic distributions for the larger units.

As in FIG. 4, sequences of acoustic sub-units that do not appear frequently in the training data are not represented by a unit triple in FIG. 5. For example, the sequence of acoustic sub-units that includes U12, U13 and U14 is not modeled by a unit triple. Instead, individual models are used for these acoustic sub-units. As in FIG. 4, these individual models can be context independent or context dependent. Similarly, under some embodiments, unit triples are not used to represent acoustic sub-units that model silence. Thus, the silence acoustic sub-unit SIL in FIG. 5 is not represented by a unit triple. Instead, the silence acoustic sub-unit is modeled individually. Note that due to the segmentation into unit triples, acoustic sub-units U4 and U5 are similarly modeled individually.

Although in FIG. 5 the acoustic sub-units that are not represented by unit triples are shown in sets of three, the invention is not limited to such segmentation. In particular, as few as a single individual acoustic sub-unit may be found between unit triples or as many individual acoustic sub-units as desired may be found between unit triples. Similarly, in FIG. 4, although two individual acoustic sub-units are shown between unit pairs, any number of individual acoustic sub-units can be found between any two unit pairs.

As is the case for sub-unit acoustic models, larger units can be either context dependent or context independent. For example, a context independent model for UT2 in FIG. 5 can be solely determined by U6, U7, U8. A context dependent model for UT2, however, will take into accounts its neighboring acoustic units, i.e., U5, U9, and/or UT3 and use a suitable probabilistic distribution for each contextual combination.

Figure 6:
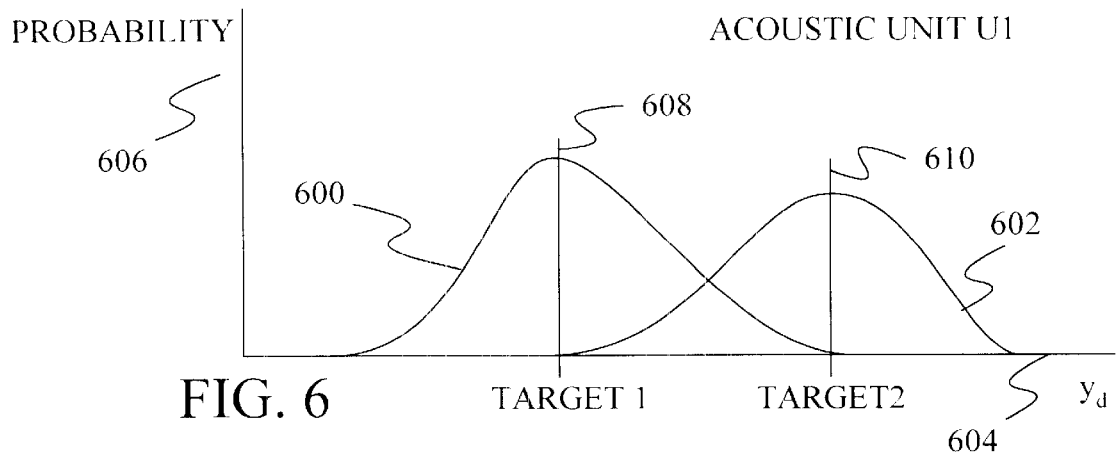
FIG. 6 is a graph showing a mixture of Gaussian distributions for one dimension of a feature vector for a first acoustic unit.
Figure 7:
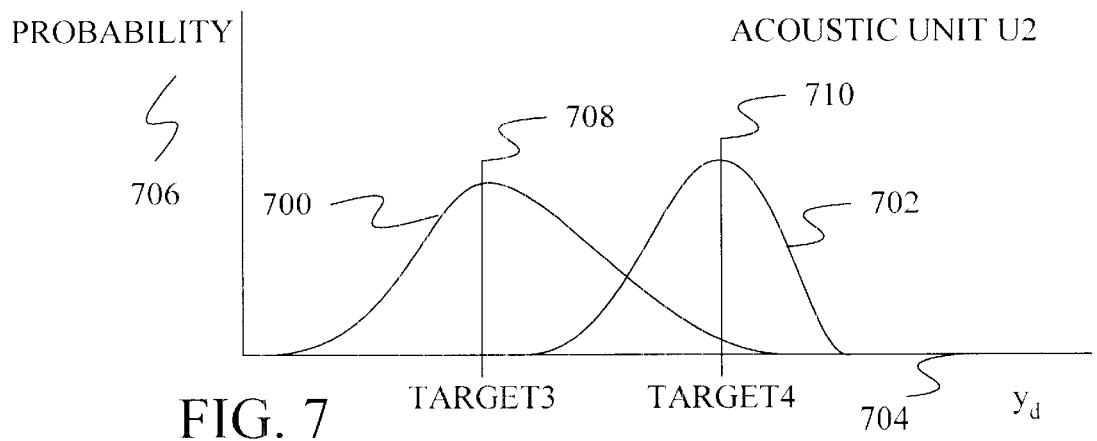
FIG. 7 is a graph showing a mixture of Gaussians for the dimension of a feature vector for a second acoustic unit.
Figure 8:
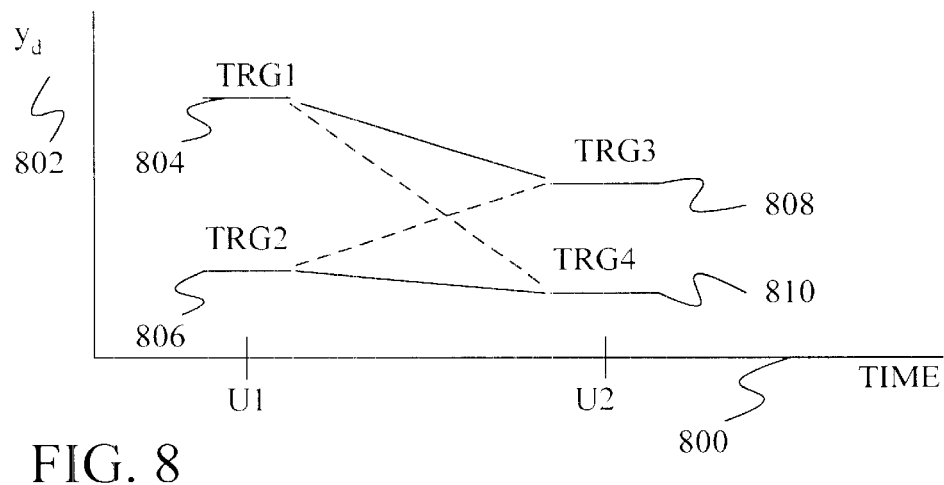
FIG. 8 is a graph showing phantom trajectories under the prior art.

The mixture of larger acoustic units and smaller sub-acoustic units is also used to reduce trajectory discontinuities under some embodiments of the present invention. FIGS. 6, 7 and 8 provide graphs that illustrate clearly the problem of trajectory discontinuities caused by target switching. In FIG. 6, two Gaussian distributions 600 and 602 are shown for a single dimension of a sequence of feature vectors. The Gaussian distributions of FIG. 6 are for an acoustic unit U1. In FIG. 6, the value of the feature vector dimension is shown along horizontal axis 604 and the probability of the value is shown along vertical axis 606.

Gaussian 600 of FIG. 6 is associated with a group of speakers' speech signals and Gaussian 602 is associated with a different group of speakers' speech signals. For example, Gaussian 600 could be produced by male speakers and Gaussian 602 could be produced by female speakers. The mean 608 of Gaussian 600 is shown as target one and represents the most probable value for the feature vector dimension based on the male speaker's data. Mean 610 of Gaussian 602 is shown as target two and represents the most probable value for the feature vector dimension for the female speaker.

FIG. 7 shows Gaussian distribution 700 and 702 for a second acoustic unit U2 but the same feature vector dimension $y_d$. Gaussian distribution 702 is associated with the same group of speakers as Gaussian distribution 602. Similarly, Gaussian distribution 700 is associated with the same group of speakers as Gaussian distribution 600 of FIG. 6. In FIG. 7, the values of the feature vector dimension are shown along horizontal axis 704 and the probability of those values is shown along vertical axis 706. Means 708 and 710 of Gaussian 700 and 702 are shown as target three and target four respectively.

During training, the trajectory of a speech signal for any one trainer remains within the Gaussian distributions associated with the trainer. Ideally, if the trainer associated with Gaussian 600 and 700 were to speak the acoustic units U1 and U2 in succession, the trajectory of their speech would travel from target one to target three. Similarly, if the trainer associated with Gaussians 602 and 702 spoke acoustic units U1 and U2 in succession, their speech trajectory would ideally pass from target two to target four. Thus, ideally, a speaker's trajectory should not switch between targets associated with different trainers.

This can be seen in FIG. 8, which shows time along a horizontal axis 800 and the value of a feature vector dimension, $y_d$ along vertical axis 802. At a time period associated with acoustic unit U1, values of target one and target two are shown at points 804 and 806, respectively. At a time associated with acoustic unit U2, target three and target four of FIGS. 6 and 7 are shown at points 808 and 810. Thus, the training data will likely include trajectories from target one at point 804 to target three at point 808 and will also include trajectories from target two at point 806 to target four at point 810. However, the training data will not include trajectories from target one to target four or from target two to target three. Because these trajectories do not occur in the training data, they are known as phantom trajectories.

Under the prior art, such phantom trajectories had to be considered as possible trajectories at the boundaries between acoustic units even though the trajectories did not occur in the training speech. Note that because the phantom trajectories do not appear in the training text, their true probability is unpredictable and should be extremely low. However, under the prior art, their realized probability was substantially higher than it should be. That is, it cannot be precluded that some phantom trajectories may turn out having higher probabilities than legitimate ones, thereby spoiling the recognition process.

Under many current systems, there are between 30 and 40 Gaussians for each dimension of the feature vectors. This means that many prior art speech systems must consider $30^2(900)$ possible trajectories, most of which are phantom trajectories. This limits the efficiency of such speech recognition systems.

One embodiment of the present invention reduces the consideration of phantom trajectories by using an overlapping recognition technique in combination with the mixture of large acoustic units and smaller acoustic sub-units. In this overlapping technique, two probabilities are determined for each feature vector wherein each of the probabilities describes the likelihood of the feature vector in association with the existence of an acoustic unit. In most cases, these two probabilities are determined by overlapping portions of large acoustic units, such as a unit pair or a unit triple as described above.

Figure 9:
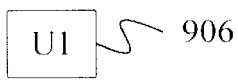
FIG. 9 is a graphical representation of an overlapping decoding technique using unit pairs of the present invention.
Figure 9:
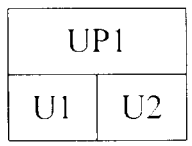
Figure 9:
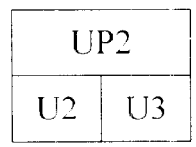
Figure 9:
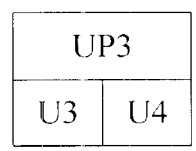
Figure 9:
Figure 9:
Figure 9:
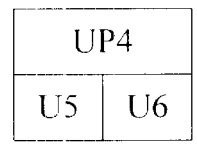
Figure 9:
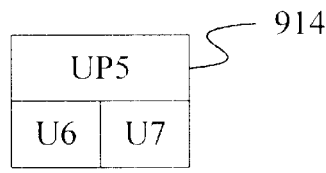
Figure 9:
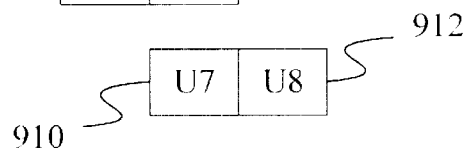
Figure 9:
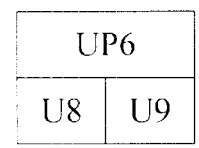
Figure 9:
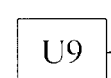

FIG. 9 provides a diagram showing the overlapping nature of the decoding process of this embodiment of the invention. In FIG. 9, time is shown along a horizontal axis 900 and the acoustic units used in decoding are shown vertically to depict their overlapping nature. In FIG. 9 a single box such as box 906 or a pair of boxes such as boxes 910 and 912 indicate that the decoder uses individual acoustic sub-unit models to determine the likelihood of the feature vectors spanned by the acoustic sub-units. Two-layer boxes, such as box 914, indicate that the decoder uses the large acoustic unit denoted in the top of the box to determine the probability of the feature vectors spanned by the individual sub-acoustic units found in the lower part of the box. Thus, box 914 indicates that the model associated with large acoustic unit UP5 is used to determine the likelihood of the feature vectors assigned to acoustic sub-units U6 and U7.

The vertical alignment of boxes in FIG. 9 indicates that the aligned boxes determine a probability for the same feature vectors. For example, acoustic unit pair UP1 and acoustic unit pair UP2 overlap along the entire span of acoustic sub-unit U2. This means that acoustic unit pair UP1 and acoustic unit pair UP2 each provides a separate probability for the feature vectors spanned by acoustic sub-unit U2.

The method of overlapping decoding represented in FIG. 9 can be seen more clearly with reference to FIG. 3. In FIG. 3, at time $t_2$, the probability of the feature vectors associated with unit pair UP1 is determined. This includes the determination of the probability of the feature vectors that span across acoustic sub-unit U2. At time $t_3$, the probability of the feature vectors associated with unit pair UP2 is determined. This probability also includes the feature vectors associated with acoustic sub-unit U2. Thus, a probability describing the likelihood of the feature vectors spanned by acoustic sub-unit U2 is determined at both time $t_2$ and time $t_3$.

As mentioned above in reference to FIG. 4, unit pairs under the present invention are generally not modeled if the unit pair appears infrequently in the training data. Instead, the individual acoustic sub-units are modeled. In FIG. 9, when a unit pair is not modeled for two acoustic, sub-units, the individual acoustic sub-units are inserted and evaluated. For example, the combination of acoustic sub-unit U7 and acoustic sub-unit U8 appears infrequently in the training data and as such there is no unit pair for these two acoustic sub-units in FIG. 9. Instead, the individual models for the two acoustic sub-units are used during the decoding process as indicated by boxes 910 and 912.

As with FIG. 4, these individual acoustic models can either be context dependent or context independent. For example, the individual model for acoustic sub-unit U7 can be a context dependent model that depends upon the identity of acoustic sub-units U6 and U8. In other words, the individual model for acoustic sub-unit U7 can be a triphone model.

Note that the individual models for the acoustic sub-units are still placed in an overlapping fashion with the neighboring acoustic models. This ensures that each feature vector will have two probabilities determined for it. Thus, the feature vectors that are spanned by acoustic sub-unit U7 have their probability determined by the individual model for acoustic sub-unit U7 and by the unit pair model UP5.

In the embodiment of FIG. 9, acoustic sub-units that represent silence are not placed in unit pairs. Instead, the silence acoustic sub-units are modeled individually. Because of this, the acoustic sub-units that neighbor the silence acoustic sub-unit must also be modeled individually. For example, in FIG. 9, silence sub-unit 902 is modeled individually as is acoustic sub-unit U4. Similarly, silence sub-unit 904 and its neighboring acoustic sub-unit U5 are both modeled individually.

Under several embodiments of the present invention, the overlap decoding technique described above is implemented without needing normalization. To achieve this, the first and last acoustic sub-units being decoded must be individually evaluated one more time to ensure that at least two probabilities are determined for the feature vectors that each of these acoustic sub-units span. In FIG. 9, this is shown with block 906 and block 908, which represent individual models for the first acoustic sub-unit U1 and the last acoustic sub-unit U9, respectively. Thus, one probability for the features spanned by acoustic sub-unit U1 is determined in block 906 and a second probability for those features is determined by unit pair UP1. Similarly, one probability for the features spanned by sub-unit U9 is determined by block 908 and one probability is determined by unit pair UP6.

The overlapping detection technique of the present invention is not limited to unit pairs as shown in FIG. 9 but can include acoustic units containing any number of acoustic sub-units. For example, in FIG. 10, an embodiment of the present invention is shown using unit triples in which three acoustic sub-units are found in each larger acoustic unit.

Figure 10:
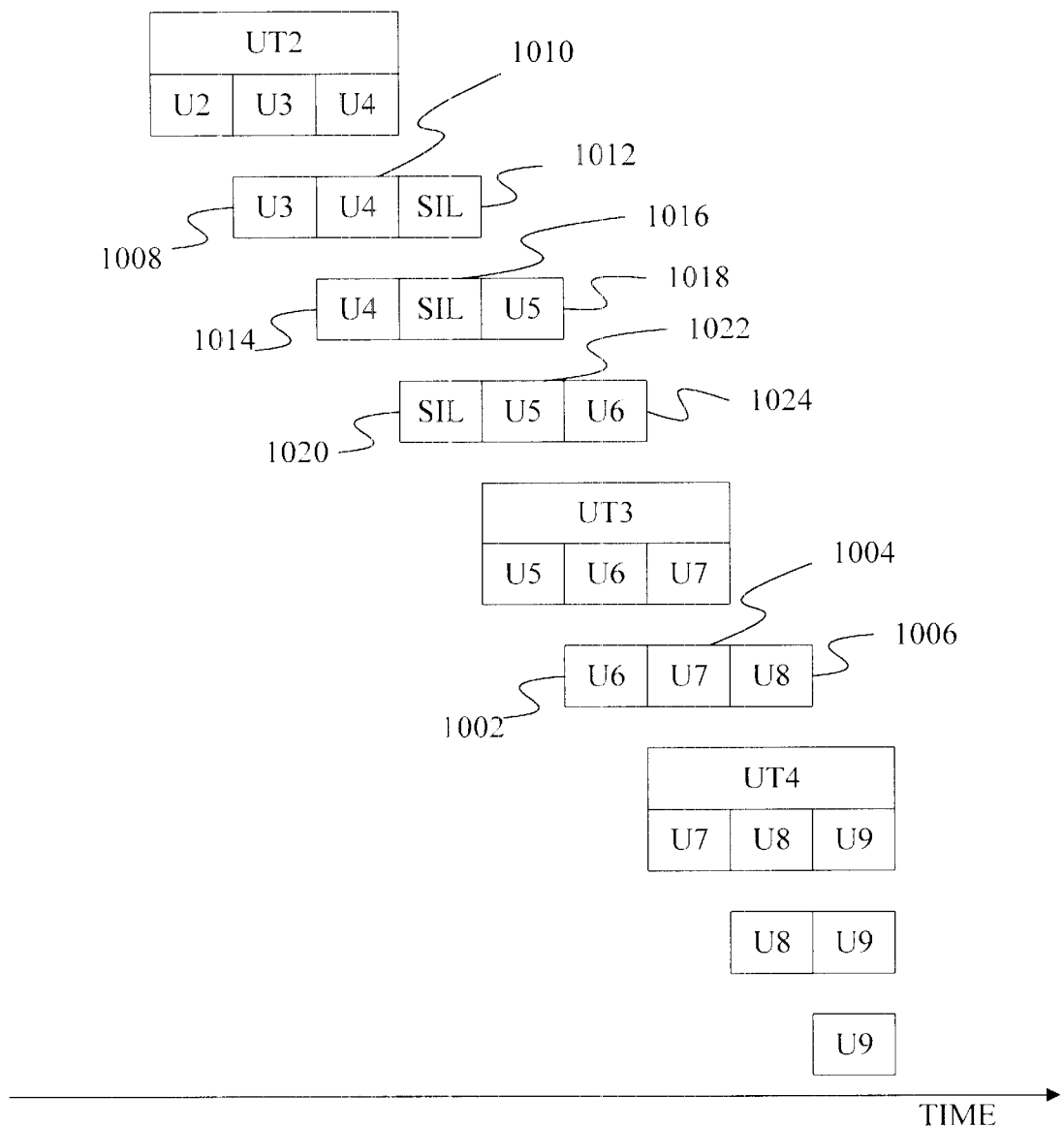
FIG. 10 is a graphical representation showing an overlapping decoding technique using unit triples of the present invention.

As in FIG. 9, time is shown along a horizontal axis 1000 and the vertical alignment of acoustic sub-units in FIG. 10 indicate that they provide a probability for the same feature vectors.

As in FIG. 9, the beginning and ending acoustic sub-units, U1 & U9 are evaluated individually two more times, and U2 & U8 are evaluated one more time to ensure that three probabilities are provided for their respective feature vectors. In addition, sequences of three acoustic sub-units that do not appear with regularity in the training data are not modeled using a unit triple but instead are modeled by individual sub-unit models. For example, blocks 1002, 1004 and 1006 indicate that acoustic sub-units U6, U7 and U8 are modeled individually because their sequence does not occur with regularity in the training data.

As in the unit pair embodiment of FIG. 9, acoustic sub-units that represent silence are not modeled by a unit triple. Instead, the silence sub-units are modeled individually. In addition, any acoustic sub-units that would otherwise be grouped with a silence sub-unit are similarly modeled individually. For example, box 1008 indicates that acoustic sub-unit U3 should be modeled individually, boxes 1010 and 1014 indicate that acoustic sub-unit U4 should be modeled individually, boxes 1012, 1016 and 1020 indicate that the silence sub-unit should be modeled individually, boxes 1018 and 1022 indicate that acoustic sub-unit U5 should be modeled individually, and box 1024 indicates that acoustic sub-unit U6 should be modeled individually.

The overlapping decoding technique of FIGS. 9 and 10 help prevent trajectory target switching because:

The large acoustic units prevent phantom trajectory between acoustic sub-units. Thus, within a unit pair or unit triple, a single Gaussian associated with a group of speakers is maintained. Because of this, the decoded trajectory is more likely to track a a group of speakers' speech targets for the acoustic units; and Overlap evaluation employs additional constraints between units for either large acoustic units or sub-units.

Although the present invention has been described with reference to preferred embodiments, workers skilled in the art will recognize that changes may be made in form and detail without departing from the spirit and scope of the invention.

What is claimed is:

1. A speech recognition system for identifying words from a series of feature vectors representing speech, the system comprising:

an acoustic model capable of providing large-unit probabilities for feature vectors spanned by each of a set of large acoustic units and sub-unit probabilities for feature vectors spanned by at least one acoustic sub-unit of a set of acoustic sub-units, the large acoustic units formed from at least two acoustic sub-units such that each large acoustic unit spans the same feature vectors spanned by the acoustic sub-units that form the large acoustic unit; and a decoder capable of generating a score that is indicative of the probability that a sequence of words is represented by the series of feature vectors, the score being based on at least one large-unit probability and at least one sub-unit probability, wherein, when combined, the acoustic sub-units associated with all of the sub-unit probabilities in the score span fewer than all of the feature vectors in the series of feature vectors.

2. The speech recognition system of claim 1 wherein the acoustic model is a segment model.

3. The speech recognition system of claim 1 wherein the acoustic model is a Hidden Markov Model.

4. The speech recognition system of claim 1 wherein each sub-unit probability is dependent in part on the identity of another sub-unit found in the sequence of words.

5. The speech recognition system of claim 1 wherein each sub-unit probability is dependent in part on the identity of another large unit found in the sequence of words.

6. The speech recognition system of claim 1 wherein each large-unit probability is dependent in part on the identity of another sub-unit found in the sequence of words.

7. The speech recognition system of claim 1 wherein each large-unit probability is dependent in part on the identity of another large unit found in the sequence of words.

8. The speech recognition system of claim 1 wherein for a large acoustic unit that appears infrequently in a set of training data, the decoder bases the score on the individual sub-unit probabilities for the acoustic sub-units found in the large acoustic unit instead of a large-unit probability associated with the large acoustic unit.

9. The speech recognition system of claim 8 wherein the individual sub-unit probabilities are context independent.

10. The speech recognition system of claim 8 wherein the individual sub-unit probabilities are dependent on the identity of other acoustic sub-units associated with the sequence of words.

11. The speech recognition system of claim 1 wherein when one of the acoustic sub-units represents silence, the decoder bases the score on the individual sub-unit probabilities associated with the silence acoustic sub-unit and an acoustic sub-unit that is next to the silence acoustic sub-unit.

12. The speech recognition system of claim 1 wherein at least one large-unit probability and at least one sub-unit probability are determined for a large acoustic unit and an acoustic sub-unit, respectively, that overlap each other.

13. The speech recognition system of claim 12 wherein each acoustic sub-unit overlaps a unit selected from the combination of the set of large acoustic units and the set of acoustic sub-units.

14. The speech recognition system of claim 12 wherein the acoustic sub-unit that overlaps the large acoustic unit is the first acoustic sub-unit associated with the sequence of words.

15. The speech recognition system of claim 12 wherein the acoustic sub-unit that overlaps the large acoustic unit is the last acoustic sub-unit associated with the sequence of words.

16. The speech recognition system of claim 1 wherein the acoustic model is further capable of providing second large-unit probabilities for feature vectors spanned by each of a set of second large acoustic units, each of the second large acoustic units formed from a different number of acoustic sub-units than the large acoustic units.

17. The speech recognition system of claim 16 wherein the score is further based on a second large-unit probability.

18. A method of recognizing speech from a series of feature vectors representing a speech signal, the method comprising:
determining a set of sub-unit probabilities describing the likelihood of feature vectors spanned by a set of individual acoustic sub-units, the set of individual acoustic sub-units spanning less than all of the feature vectors in the series of feature vectors;
determining a large-unit probability describing the likelihood of feature vectors spanned by a large acoustic unit, the large acoustic unit representing a combination of at least two acoustic sub-units such that the large acoustic unit spans the feature vectors spanned by the combination of at least two acoustic sub-units; and
identifying a most likely sequence of hypothesized words based on the sub-unit probabilities and the large-unit probability.

19. The method of claim 18 wherein determining the set of sub-unit probabilities comprises determining probabilities based on the identity of other acoustic sub-units associated with a sequence of hypothesized words.

20. The method of claim 18 wherein identifying a most likely sequence of words comprises utilizing two individual acoustic sub-units' sub-unit probabilities when the large acoustic unit formed from the two acoustic sub-units appears infrequently in a set of training data.

21. The method of claim 18 wherein identifying a most likely sequence of words comprises utilizing two individual acoustic sub-units' sub-unit probabilities when one of the individual acoustic sub-units represents silence.

22. The method of claim 18 wherein identifying a most likely sequence of words comprises utilizing a sub-unit probability and a large-unit probability for an individual acoustic sub-unit and a large unit, respectively, that overlap each other.

23. A speech recognition system for identifying words from a series of feature vectors representing speech, the system comprising:
an acoustic model capable of providing acoustic unit probabilities for feature vectors spanned by each of a set of acoustic units; and
a decoder capable of generating a score that is indicative of the probability that a sequence of words is represented by the series of feature vectors, the score being based on at least two acoustic unit probabilities associated with two acoustic units that only partially overlap.

24. The speech recognition system of claim 23 wherein the acoustic unit comprises an acoustic unit formed as the combination of a plurality of acoustic sub-units.

25. The speech recognition system of claim 24 wherein the acoustic units comprise unit pairs formed from the combination of two phoneme sub-units.

26. The speech recognition system of claim 24 wherein the acoustic units comprise unit triples formed from the combination of three phoneme sub-units.

27. The speech recognition system of claim 24 wherein the acoustic units comprise unit pairs formed from the combination of two senone-based sub-units.

28. The speech recognition system of claim 24 wherein the acoustic units comprise unit triples formed from the combination of three senone-based sub-units.

29. The speech recognition system of claim 24 wherein the acoustic model is further capable of providing acoustic sub-unit probabilities for feature vectors spanned by each of a set of acoustic sub-units.

30. The speech recognition system of claim 29 wherein the score is further based on an acoustic sub-unit probability and an acoustic unit probability for an acoustic sub-unit and an acoustic unit that overlap.

31. The speech recognition system of claim 30 wherein the acoustic sub-unit that overlaps the acoustic unit is the first acoustic sub-unit in the sequence of words.

32. The speech recognition system of claim 30 wherein the acoustic sub-unit that overlaps the acoustic unit is the last acoustic sub-unit in the sequence of words.

33. The speech recognition system of claim 30 wherein the acoustic sub-unit probability is determined in part based on the identity of other acoustic sub-units in the sequence of words.

34. A method for recognizing speech from feature vectors representing a speech signal, the method comprising:
determining a first acoustic probability describing the likelihood of feature vectors spanned by a first acoustic unit;
determining a second acoustic probability describing the likelihood of feature vectors spanned by a second acoustic unit, the first acoustic unit spanning at least one but not all of the feature vectors spanned by the second acoustic unit, and the second acoustic unit spanning fewer than all of the feature vectors spanned by the first acoustic unit; and identifying a most likely sequence of hypothesized words based on the first acoustic probability and the second acoustic probability.

35. The method of claim 34 wherein determining the first acoustic probability comprises determining the likelihood of feature vectors spanned by an acoustic unit formed as the combination of a plurality of acoustic sub-units.

36. The method of claim 35 wherein determining the second acoustic probability comprises determining the likelihood of feature vectors spanned by an individual acoustic sub-unit.

* * * * *

UNITED STATES PATENT AND TRADEMARK OFFICE
CERTIFICATE OF CORRECTION

PATENT NO. : 6,629,073 B1 Page 1 of 1
DATED : September 30, 2003
INVENTOR(S) : Hsiao-Wuen Hon et al.

It is certified that error appears in the above-identified patent and that said Letters Patent is hereby corrected as shown below:

Column 1,
Line 62, "asset" should read -- a set --

Column 4,
Line 50, "interfaces" should be -- interface --

Column 11,
Line 2, delete "," after "acoustic"

Signed and Sealed this

Thirteenth Day of April, 2004

JON W. DUDAS
*Acting Director of the United States Patent and Trademark Office*